Feb. 9, 1965 W. F. EILERT 3,168,890
FREE BREATHING TWO CYCLE INTERNAL COMBUSTION ENGINE
Filed Oct. 16, 1962 2 Sheets-Sheet 1

INVENTOR.
WILLIAM F. EILERT
BY
*Zoltan Holoschi*
ATTORNEY

INVENTOR.
WILLIAM F. EILERT
BY
ATTORNEY 3,168,890
FREE BREATHING TWO CYCLE INTERNAL
COMBUSTION ENGINE
William F. Eilert, 80 Reed Ave., Pelham Manor, N.Y.
Filed Oct. 16, 1962, Ser. No. 230,829
1 Claim. (Cl. 123—73)

This invention relates to internal combustion engines, and more particularly concerns an internal combustion engine having a novel valve control arrangement.

According to the invention, there is provided an internal combustion engine having a crankcase upon which is mounted a cylinder. A piston is reciprocated in the cylinder and drives a crankshaft in the crankcase. A fuel supply conduit or manifold is connected between the crankcase and cylinder above the piston. A mixture of air and vaporized fuel is supplied to the crankcase. A check valve is located at the upper end 26' of the conduit opening into the cylinder. A fuel mixture is drawn into the crankcase during each compression stroke of the piston as it moves axially upwardly in the cylinder. At the same time a fuel mixture previously fed into the cylinder is being compressed. The compressed fuel mixture is then ignited. The power stroke of the piston then ensues, the piston moves down and compresses the fuel mixture in the crankcase. As the piston passes an exhaust port or ports in the cylinder, the pressure in the cylinder falls below the pressure in the crankcase and the fuel mixture in the crankcase is fed into the cylinder through the conduit and past the valve. As the piston moves up for the next compression stroke the valve at the fuel inlet of the cylinder is closed by rising pressure in the cylinder. A light spring may be provided to insure a quick action of the valve in closing during the compression stroke. The invention makes possible improving scavenging of spent gases in an internal combustion engine by substantially eliminating loss of fresh fuel through exhaust ports.

The invention provides an improved two-cycle engine of simplified construction in which use of prior known cams, camshafts, push rods, rocker arms, precision ground valves, and the like is avoided. The invention is applicable to Diesel type engines and to spark ignited engines.

It is therefore a primary object of the invention to provide an internal combustion engine having a piston movable in a cylinder, a crankcase into which a fuel mixture is fed and a valve controlled conduit connected between the crankcase and cylinder, the piston compressing the fuel mixture in the crankcase and driving it into the cylinder.

Another object is to provide an engine as described, wherein the engine has one or a plurality of exhaust ports, and the valve is spring loaded to a normally closed position.

A further object is to provide an engine as described wherein the piston has a wedge-shaped head to facilitate and improve scavenging of spent gases.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
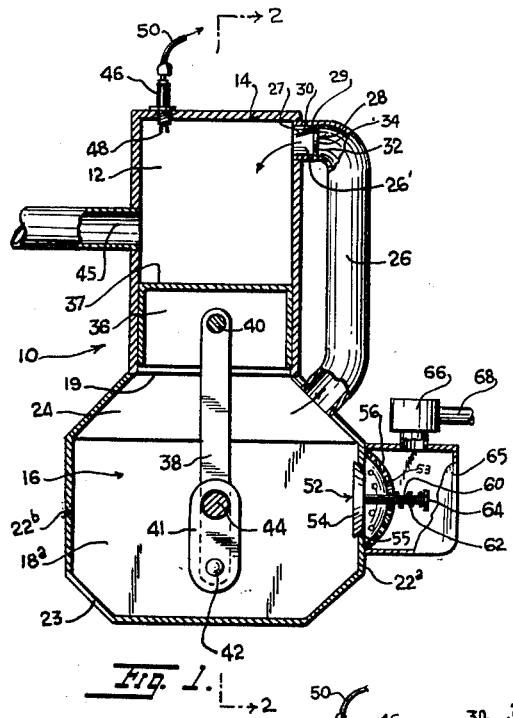
FIG. 1 is a vertical sectional view through a two-cycle internal combustion engine embodying the invention, showing the parts at one stage in the operation cycle of the engine.
Figure 2:
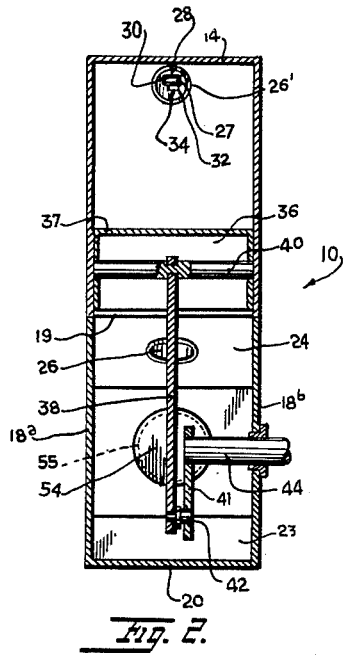
FIG. 2 is a vertical sectional view taken on line 2—2 of FIG. 1.
Figure 3:
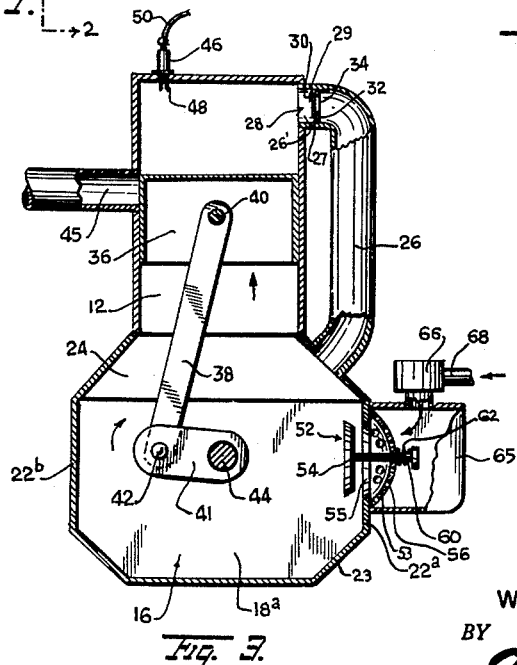
FIG. 3 is a sectional view similar to FIG. 1 showing the engine parts at another stage in the operation cycle.

Referring first to FIGS. 1–3, there is shown an internal combustion engine 10 having a cylinder 12 provided with a closed circular head 14. The cylinder is open at the bottom and is secured to the upper end of a crankcase 16 at which is a round opening 19. The crankcase has parallel side walls $18^a$, $18^b$, a bottom wall 20, and end walls $22^a$, $22^b$. The end walls are provided with inclined flat lower wall portions 23 and an upper tapered rectangular-to-round section 24. A conduit or manifold 26 is connected between one wall portion 24 and the upper end of cylinder 12. At the upper end of conduit 26 is a check valve 28. This valve has a vane or flap 27 which opens inwardly toward the cylinder. The valve has a hinge 29 and may be provided with a spring 30 which lightly biases the vane 27 to a closed position. The valve includes a stationary partition 32 in the conduit. The partition has an aperture 34 which is closed by the vane 27. A piston 36 having a piston head 37 is movable axially in the cylinder. A connecting rod 38 is connected at its upper end to a wrist pin 40 secured to opposite sides of the piston. The connecting rod 38 is engaged with a crank 41 by a crank pin 42. The crank is connected to a crankshaft 44 by means of which power is taken off from the engine. The crankshaft extends outwardly through side wall $18^b$.

Exhaust port 45 is located at one side of the cylinder between the open and closed ends of the cylinder. The port is located so that it will be closed during the upward or compression stroke of the piston. A spark plug 46 is mounted on the head 14 of the cylinder. The plug is provided with a high voltage via a cable 50 for producing a spark across electrodes 48 in the cylinder 12.

Fuel is supplied to the crankcase in the form of a mixture of air and vaporized gasoline or other combustible fluid via a valve 52. The valve includes a circular head 54 which seats in a hole 55 in the end wall $22^a$. The valve is supported by a curved screen 53 having a plurality of holes 56 for filtering the fluid fuel mixture. The screen has a central hole 58 in which is axially movable a valve rod 60 carrying the valve head 54. A coil spring 62 on the rod bears on the outer end of the screen and a flange 64 on the outer end of rod 60. The spring biases the valve to a closed position. A fuel chamber 65 encloses the screen and valve on the outer side of end wall $22^a$. A carburetor 66 attached to the chamber 65 serves to mix air with the fuel supplied through fuel line 68.

In operation of the engine, the piston begins its compression stroke at the lowermost position shown in FIGS. 1 and 2. Flow of fuel into the cylinder 12 is just ceasing as indicated by the open position of valve 28. As the piston rises and passes exhaust port 45 in its compression stroke, valve 28 closes due to increase in pressure in the cylinder. At the top of the piston stroke, ignition of the fuel by means of spark plug 46 occurs. The piston then begins its power stroke downward driving the piston shaft and turning the crankshaft 44. FIG. 2 shows the piston at the point in the compression stroke when the exhaust port 45 is closed and valve 28 is closed while the fuel in cylinder 12 is being compressed. At the same time gas pressure in the crankcase 16 is reduced as the piston rises in the cylinder. This permits valve 52 to open while spring 62 is compressed. A fuel mixture enters the crankcase and moves up the conduit but is stopped at closed valve 28.

During the power stroke the piston is driven downward. As the piston passes the exhaust port 45, at substantially mid-position in the downward stroke thereof as shown in FIG. 3, scavenging of burnt or spent gases takes place through this port. At the same time valve 28 opens because of the fall in pressure in cylinder 12 and the fresh mixture enters the cylinder via valve 28. The fresh mixture entering the cylinder speeds up the scavenging since the fresh mixture replaces the burnt gases. The piston then finishes its power stroke and starts its upward compression stroke which is the point at which the parts are shown in FIGS. 1 and 2, to repeat the cycle.

Figures 6, 7:
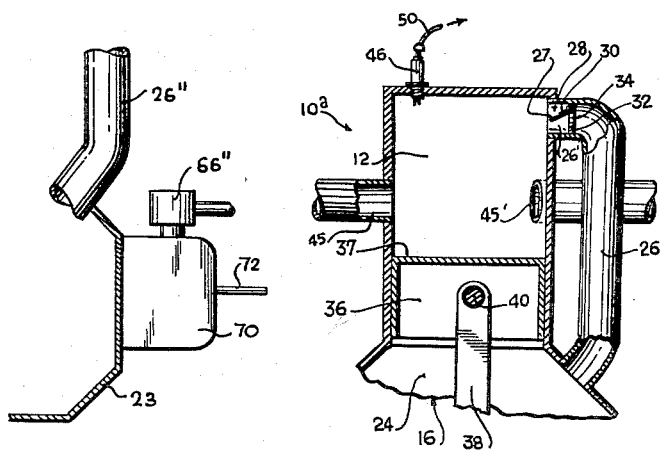
FIG. 6 is a fragmentary sectional view similar to a part of FIG. 1 illustrating another engine embodying the invention.
FIG. 7 is a fragmentary elevational view showing modified means for supplying air or fuel/air mixture.

FIG. 6 shows an engine 10$^a$ which is similar to engine 10 except that the cylinder has a plurality of circumferentially spaced exhaust ports 45, 45'. This arrangement further speeds up the scavenging and increases the efficiency and power output of the engine.

Figure 4:
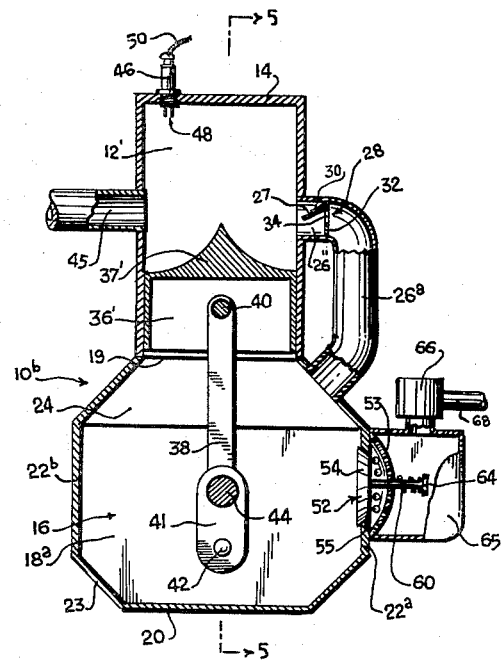
FIG. 4 is a vertical sectional view similar to FIG. 1 showing another engine according to the invention.
Figure 5:
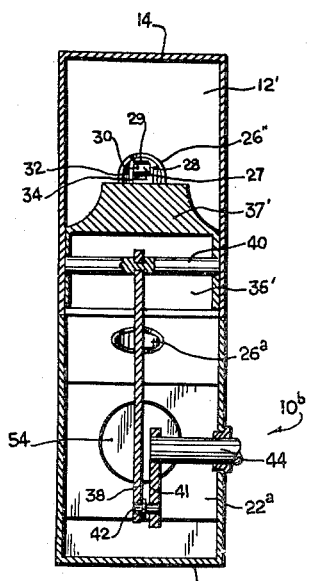
FIG. 5 is a sectional view taken on line 5—5 of FIG. 4.

FIGS. 4 and 5 show another engine 10$^b$ similar to engines 10 and 10$^a$ and corresponding parts are identically numbered. The piston 36' has a wedge-shaped head portion 37' which extends upwardly in cylinder 12'. Conduit or manifold 26$^a$ is somewhat shorter than conduit 26 of engine 10 and the open upper end 26'' of the conduit is substantially diametrically opposed to exhaust port 45. Other parts of the engine are the same as in engine 10.

In operation of engine 10$^b$, the wedge-shaped piston head portion 37' serves as a partition between the incoming fresh fuel mixture admitted through open valve 28 and spent gases being exhausted through the exhaust port. This improves scavenging of gases and increases efficiency of the engine.

In the several forms of the invention, the valve 28 serves as a positive barrier between the cylinder and crankcase and prevents backfiring between the two even when the engine runs slowly. The valve 28 is closed by the greater force acting upon it inside the cylinder. The present invention has been shown applied to two-cycle engines, each of which has one power stroke in every revolution of the crankshaft. Due to the positive check valve closing in the conduits 26, 26$^a$ the engine will idle more smoothly and quietly than prior two-cycle engines. When the engine is used as an outboard motor it will permit slower trolling with higher power than is possible with conventional two-cycle engines. At low speeds marked reduction in power consumption will be noted due to greater efficiency and substantial elimination of wastage of fresh fuel during the scavenging of burnt gases. The engine will idle at half the speed of a four-cycle engine of the same size which has a power stroke once in every two shaft revolutions and will do so with substantially the same smoothness and quietness.

The present invention comprehends that scavenging air or fuel/air mixture may be supplied by a blower or supercharger indicated generally at 70 in FIG. 7 located between the carburetor 66'' and the check valve conduit 26''. This blower or supercharger could be driven by belt, chain, gears or by an exhaust turbine (turbo-supercharger), indicated generally at 72.

While I have illustrated and described the preferred embodiments of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A two-cycle internal engine comprising a gas-tight crankcase, a cylinder mounted on said crankcase with the lower open end thereof disposed over a complementary opening in the top wall of said crankcase and the upper end thereof closed by a cylinder head; a rotatably mounted crankshaft having a crank disposed within said crankcase; a hollow piston, open at the lower end thereof and closed at the upper end thereof by a piston head, reciprocally mounted in said cylinder; a wrist pin carried by said piston, a connecting rod connected between said crank and said wrist pin; a check valve in the crankcase wall through which fuel is supplied to said crankcase; a fuel supply conduit connected between said crankcase and an intake port in said cylinder through which fuel is supplied to said cylinder from said crankcase, a check valve disposed in said supply conduit; an exhaust conduit connected to a discharge port in said cylinder through which burnt gases are discharged from said cylinder; said intake and discharge ports being disposed in axial alignment with each other intermediate the upper and lower ends of said cylinder in position to be opened by said piston when said piston is in substantially mid-position on the downward stroke thereof; ignition means mounted in said cylinder head; the upper surface of said piston head comprising an inverted wedge having a transversely extending apex which is disposed perpendicular to the aligned axes of the said cylinder intake and discharge ports in vertically spaced relation to said piston head, and a pair of opposed concave side walls which extend downwardly and outwardly from said apex; the wedge-shaped upper surface of said piston head serving as a partition between the said intake and discharge ports of said cylinder to direct incoming gaseous fuel upwardly in said cylinder and the burnt gases downwardly and out through said discharge port into said exhaust conduit.

References Cited by the Examiner

UNITED STATES PATENTS

| | | | |
|---|---|---|---|
| Re. 16,108 | 7/25 | Newcomb | 123—73 |
| 386,211 | 7/88 | Nash | 123—73 |
| 856,760 | 6/07 | Bense | 123—73 |
| 877,834 | 1/08 | Daniel | 123—73 |
| 957,657 | 5/10 | Daniel | 123—73 |
| 1,008,199 | 11/11 | Reigels | 123—73 |
| 1,360,217 | 11/20 | Hunt | 123—73 |
| 1,438,877 | 12/22 | Tobeler | 123—65 |
| 1,733,431 | 10/29 | Sherman | 123—73 |
| 2,132,223 | 10/38 | Slatinsky | 123—65 |

FOREIGN PATENTS

| | | |
|---|---|---|
| 338,894 | 6/04 | France. |
| 531,988 | 11/21 | France. |
| 7,926 | 4/13 | Great Britain. |

FRED E. ENGELTHALER, *Primary Examiner.*